Patented Feb. 7, 1928.

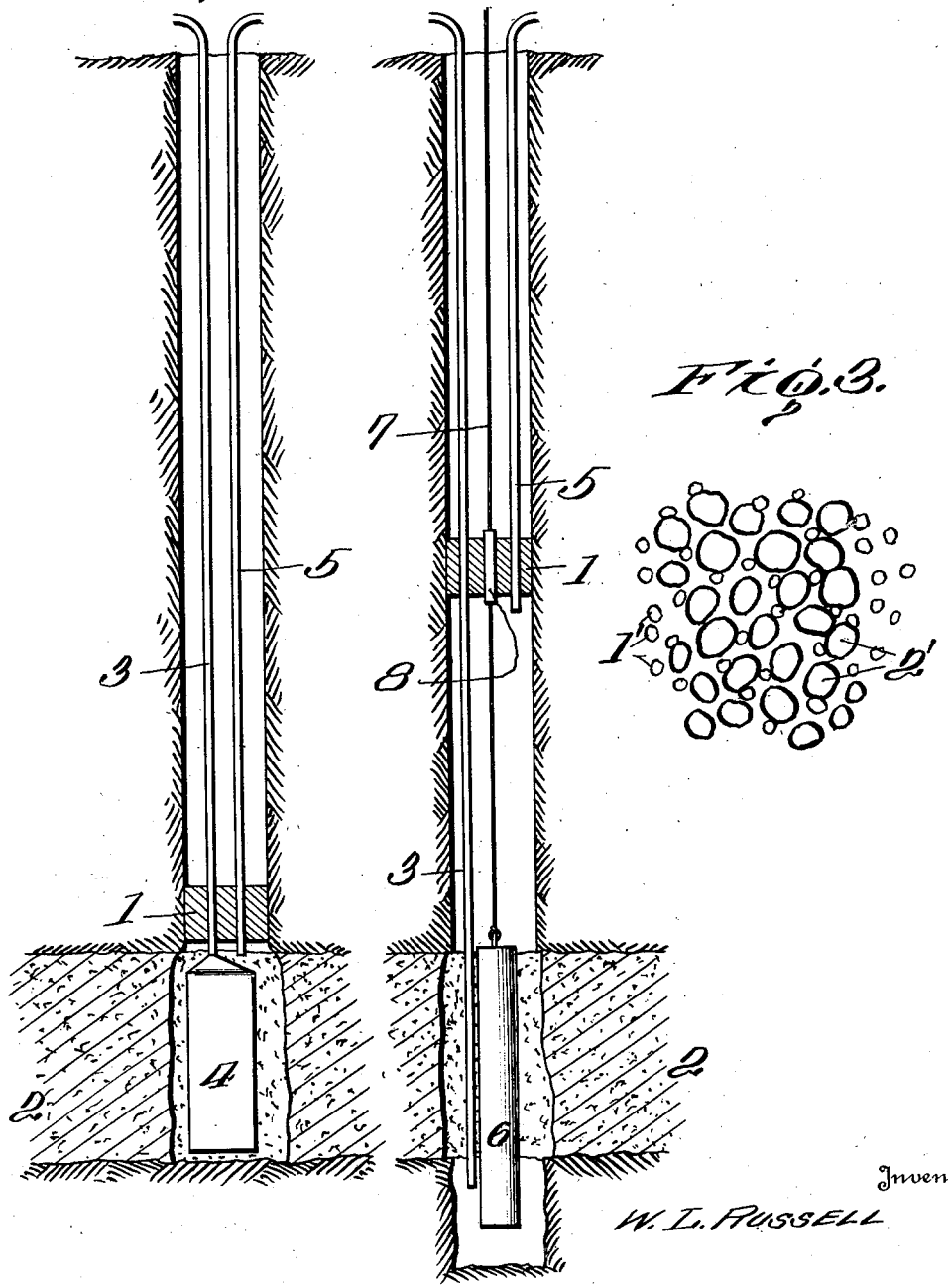

1,658,305

UNITED STATES PATENT OFFICE.

WILLIAM L. RUSSELL, OF NEW HAVEN, CONNECTICUT.

ART OF EXTRACTING HYDROCARBONS FROM OIL-BEARING STRATA.

Application filed June 8, 1923. Serial No. 644,257.

In my previous application No. 594,427, filed October 14th, 1922, Patent No. 1,511,067, issued October 7th, 1924, I claimed generically my improvement in the art of extracting hydro-carbons from oil bearing strata by means of water saturated with gas under pressure.

My present application is a continuation in part of my former patent and covers certain further improvements and explanations, together with a new method of combining the water and the gas by alternately forcing each into the oil bearing strata.

My discovery enables me to utilize a positive force, to attract the residual oil and carry it to the venting well.

I have discovered a scientific law in regard to the action of liquid gas surfaces on oil, that such surfaces when brought in the form of bubbles into contact with oil attract such oil to its surface, and I have devised a method of applying my scientific discovery to the recovery of residual oil from oil-bearing strata. I both introduce these liquid gas surfaces in the form of bubbles into the oil bearing strata, and multiply them therein and ensure that such bubbles remain suspended in the flood throughout the strata so as to move with the flood into contact wtih the residual oil, picking up such oil and carrying it to the point of discharge. I moreover provide a continuous stream of such bubbles as the flood advances through the strata.

I make no claim to the action of liquids or gases acting independently. My invention is limited to their combined or supplemental action on residual oil, and especially on the ability of liquid gas surfaces in the form of bubbles, resulting from the mixture of such liquid and gases, to dislodge, pick up and carry residual oil. My invention includes my process of multiplying the formation of such bubbles and introducing them throughout the length, breadth and depth of the strata, as well as in forming them artificially therein.

Though previous attempts have been made to introduce fluids and gases into the strata, no operable means of combining them therein have been shown or suggested. There had been no suggestion of any combination or co-operation between a liquid and a gas to dislodge the oil. In all previous attempts the liquid and the gas have been designed to operate separately. Pressure or heat or both combined have been relied on to aid in dislodging the oil. The liquid has continued to act as a propelling agent to wash out and push along the oil, while the gas has continued to act as a pressure agent only on the oil in mixing with the gaseous product in the upper strata. Heretofore, pressure, natural or artificial, and capillarity have been the means to force oil from the oil bearing strata. The pressure causing oil to flow into wells, is commonly known as rock pressure. This pressure is due in part to the gas absorbed in the oil, which exerts a constant pressure on the oil bearing strata.

Whatever may be the true explanation of rock pressure, it is well established that the production of oil fields decreases with the decrease in rock pressure. Indeed, it is generally accepted that many unproductive sands contain oil, but without the necessary rock pressure to force the oil into the well.

Various methods have been used in the endeavor to keep up production and recover residual oil, after rock pressure has declined. Among these, the best known are the vacuum, flooding and (Smith-Dunn) compressed air processes. These methods attempt to reproduce artificially the lost rock pressure. They succeed only partially, and all have their limitations. While the removal of atmospheric pressure or the flooding of the sands by water or compressed gas does force out residual oil, the amount of oil thus recovered is limited, and the processes are successful only under certain conditions.

For example the use of the flooding process is limited to the finer grained sands of uniform porosity, such as those found in the Bradford Field.

In my invention, I combine the two agencies of water and gas in the manner hereinafter set forth. By this combination, I obtain several advantages. I not only succeed in reproducing more nearly the natural conditions of rock pressure, but also am enabled, by my invention to produce artificially conditions in the sand enabling the forces of capillarity, adhesion and surface tension to be utilized to hold and recover the residual oil. I utilize an agent produced artificially to pick up and carry the oil to the venting well, and thus am able to recover by my method of combining the water and gas more residual oil than would be possible with the use of all the other methods.

In flooding, a solid body of water is forced through the sand from the intaking well. Obviously that portion of the residual oil which blocks the path through the interstices of the sand is displaced by being pushed bodily before the advancing flood. In fine sands having an effective size less than 0.1 mm., capillarity drives the residual oil from the surfaces of the grains, and above the head of the water. This enables flooding to act successfully in fine and uniform sands. If however, the sand is coarse or highly varied in porosity and texture the flooding will not be successful.

In my method I similarly use the shoving force of the water together with the capillary force, but by saturating the water with gas under pressure, and by mixing gas and water I supplement these forces so as to enable flooding to be effective in the coarser and nonuniform sands.

By thus saturating the water before flooding, I distribute throughout its mass the latent force of gas which later becomes active as the pressure diminishes, when the flood is forced through the sand away from the intake well. Thus by causing gas to be liberated from the water, as the pressure diminishes, I reproduce artificially more exactly natural conditions. I thus am enabled to use my method to advantage on any sand which once produced oil.

One reason why my method can be used where the ordinary flooding methods are inapplicable, seems explainable as follows:

Water will extract but little oil from coarse sands because capillarity does not act when sands are flooded. The water tends to travel through the coarse or porous strata, leaving the oil in the remaining strata undisturbed. In my method the bubbles which form in the coarser sands block up the interstices, serving as a temporary dam so to speak checking the flood in that strata and causing the water to flow through the remainder of the strata even though the sand in that strata be finer in texture. Moreover the attraction of the bubbles for oil causes part of the oil that remains adhering to the sand grain to leave the sand grain and adhere to the bubbles. This extraction of the residual oil by the bubbles takes place in the coarse as well as the fine grained sands.

It is seen that my discovery applies the well known principle that the adhesive force of oil to a watergas surface is greater than the surface tension of the oil. Thus when oil rises to the surface of the water, the surface tension is not able to longer hold it in its globular form, so the oil spreads out over a wide surface of water.

Oil similarly adheres and spreads when brought into contact with other water gas surfaces so that such surfaces are said to possess the quality of attracting oil, even tho this power to attract oil is limited to a very thin film.

In order therefore, to enable the water gas surface to have a sufficient quantity of oil adhering to it to be of any value commercially, means must be found to increase it so that the oil adhering to the surface, however minute per unit area, may bulk in the aggregate considerable volume.

This is one reason it has not heretofore been possible to utilize commercially this power of water gas surfaces to attract oil. I have finally succeeded in solving the problem by means of a process of multiplying indefinitely the areas of the water gas surfaces, so that they become carriers of sufficient oil, to be of value commercially.

I increase the water gas surfaces by impregnating the water used for flooding from top to bottom with myriads of small water gas surfaces in the form of bubbles, each bubble capable of causing a film of oil to adhere to its surface. As the water so impregnated is forced through the sand, each bubble, coming into contact with residual oil which had previously failed to be dislodged from the grains of sand, draws this oil to its water gas surface, covering the bubble with a film of oil. In some such way the bubbles serve as carriers, picking up the oil which the other processes failed to dislodge, and which could not be otherwise recovered. Though the amount of oil that any one bubble can carry is limited to a very thin film, fresh bubbles carried along by the current of water are continually being brought into contact with the residual oil to attract some of it to its surface. No matter how small the amount of oil each individual bubble may carry, if a succession of such bubbles be brought into contact with the oil, the amount of oil so carried may be in the aggregate considerable. Throughout this application "sand" is used in a similar sense to "oil bearing strata"; and "bubbles" include all water gas surfaces however large.

However erroneous the theory above set forth may be, my experiments prove conclusively that these bubbles do serve effectively as carriers of oil, and enables residual oil to be removed from the oil bearing strata.

While obviously the superiority of my method can be best proven on a sand which has "watered out" or a well gone dry. my invention is not limited to use only after flooding or compressed air. It can be used on any and all wells of small production to increase their output and as a substitute to other methods. It can also be introduced at any stage to supplement or reinforce flooding or to increase the flow.

In applying my method the resistance the sand offers to the introduction of bubbles presents a difficulty at the very outset, since bubbles cannot be forced into the oil sand.

No matter how great the pressure, the bubbles will rise to the surface of the water in the well instead of entering the sand. In my previous application #594,427, I overcame this difficulty by causing the bubbles to form after the water had been introduced into the sands. In other words, I introduced sufficient pressure to cause the gas to be absorbed in the water.

In my present application, I overcome the difficulty by forcing water and gas alternately into the sand, so as to effect the mixture of the two in the sand itself. Thus, these water gas surfaces or bubbles are diffused from top to bottom of the sand.

By my method of alternately forcing a liquid and a gas into the strata, under much higher pressure than the prevailing rock pressure of the strata, I am able to vary the proportion as well as the frequency of the alternation, thus expediting the mixing of the liquid and the gas within the strata, and increasing the amount of water-gas surfaces as desired. One of the advantages of this method is that the liquid and gas can be quickly and thoroughly mixed in the desired proportions within the strata, so that the desired quantity of bubbles can be formed at the pressure point. The amount of pressure, the alternation of the liquid and gas and the relative proportions of each would be regulated so that from the inlet to the outlet a mass of liquid gas surfaces in the form of bubbles would permeate the length, breadth and depth of the strata. Moreover, not only would there be a continuous stream of fresh bubbles due to the decreasing pressure, but the original bubbles in their progress through the strata would increase in size and break up into smaller bubbles. Thus a continuous formation of new liquid gas surfaces is ensured.

Were it not a fallacy that bubbles always rise to the surface, they could not be utilized as carriers of oil. It has been found by my repeated experiments that bubbles when suspended in water in the sand, do not rise but are carried along horizontally with the current of water. The reason these bubbles do not rise in the sand strata as they do in water is probably because they are prevented by their surface tension. The resistance their surface tension offers to their movement is greater than the buoyancy of the bubbles and thus keeps them suspended in the water and causes them to be forced along horizontally with the flood.

Obviously the mechanical means by which water and gas can be forced into the oil sands are various.

As in my application #594,427, I insert a packer above the oil sand and run through the packer two pipes, one ending just above the sand and the other just below the sand. In my former application the upper pipe contained water under pressure and the lower pipe air under pressure and thus water was saturated with the air or gas at the bottom of the well before being forced into the sand.

In the present application the water and gas or air are separately forced into the sand after which the water and gas so forced mix. As the water is forced through the sand, it carries with it the bubbles formed by the gas and water mixing, and in addition the new bubbles continually being released from the gas saturated water as the pressure diminishes. Thus the bubbles are uniformly diffused from top to bottom of the sand.

I force the gas and water separately into the oil sand by inserting the packer in the well above the oil sand with a pipe passing through the packer to the bottom of the well below the exposed sand and a second pipe also passing through the packer but ending higher up above the exposed sand. This arrangement is similar to that in my former application. In my present invention however, the lower pipe is the water feed pipe and the upper pipe is the gas feed pipe, which is the reverse of my former application. Thus by increasing the pressure in the gas feed pipe or decreasing it in the water feed pipe or doing both simultaneously the exposed oil sand is cleared of water. The exposed oil sand is thus freed of water while air is forced into it. In the same way by increasing the pressure in the water feed pipe or decreasing it in the gas feed pipe, or doing both simultaneously, the water line is raised until it covers the exposed oil sand when water again is forced into the sand. By repeating this process water and gas are alternately forced into the sand. As the layers of water and gas are forced into the sand they intermix owing to their subdivision among the branching pores and bubbles form.

To illustrate my invention Fig. 1, is an elevation in section through an oil well. Fig. 2, is an alternative form. Fig. 3, is a detail portion of an oil sand showing the grains and bubbles enlarged.

In Fig. 1, the packer or plug, 1, is inserted above the oil sand 2. The water feed pipe 3 extends through the packer ending below the oil sand at the bottom of the well. It has an enlarged lower portion 4 which serves as an air chamber or reservoir. The upper end of the water feed pipe is preferably connected with a water pump, or tank. The air feed pipe 5 passes through the packer and ends above the oil sand. Its upper end is connected with an air compressor.

After flooding the bottom of the well below the packer through the water feed pipe, the water is forced into the sand for the desired time. Then the exposed oil sand is freed of water, and exposed to air under pressure for the desired time.

By decreasing the pressure in one pipe as the other is increased, the change from water to air or air to water can be effected without appreciable change of pressure.

Fig. 2, illustrates an apparatus for raising and lowering the water level in the bottom of the well by mechanical pressure without changing the pressure. This is accomplished by means of introducing a weight or plunger 6 into the bottom of the well. By means of the cable 7 running through the pipe 8 this weight may be raised up out of the water so as to lower the water level below the oil sand. The bottom of the well must need to be a few feet below the bottom of the oil sand and the plug 1 must be placed a few feet above the top of the sand, in order to enable the weight to be hauled up above the sand. The weight is made of as large diameter as the size of the casing will permit so as the better to raise and lower the water level.

Thus the exposed oil sands may be left either under gas presssure or flooded with water under pressure for the desired length of time. By continuing the process water and gas in the desired proportions are alternately forced into the sand. These quickly mix in the sand owing to the subdivisions among the branching pores. The gas not absorbed in the water will remain suspended in the flood in the form of bubbles, then, as a pressure at the intake well continues to force the flood through the sand, the pressure of the advancing flood will continually diminish with the distance from the intake wells. As the pressure diminishes additional bubbles are continually forming and being carried along through the oil sands by the flood. The quantity and size of these bubbles is controlled by the pressure and the length of time which the gas and the water will remain in contact with the exposed oil sands. Thus the gas and water may be mixed in the proportions desired.

In Fig. 3, the dark larger circles 2' represent the enlarged grains of sand. The lighter smaller circles 1', represent bubbles partly filling the interstices between the grains. These bubbles as they are carried along by the current of water come in contact with the grains of sand and the residual oil and some of the oil adheres to each bubble which thus acts as a carrier for the oil.

I have used the term gas as meaning not only natural gas but carbon dioxide or any other gaseous material, as well as air. Under the usual pressure, as the water enters the sand approximately one-half volume of air or one volume of natural gas would be absorbed by one volume of water.

Obviously the bubble method can be advantageously employed in a single well by forcing the gas saturated water into the oil sand under pressure at the well, and then removing the pressure, so as to permit the water to flow back into the well. On relieving the pressure, the liberated gas will be suspended in the water in the form of bubbles which pick up the oil as they are carried back into the well by the inflowing current of the water.

I do not claim that I can extract all the residual oil. Indeed, I believe this to be impossible on a commercial scale. I do claim that my process enables residual oil to be recovered from sands after every other process has been tried and all oil possible by their use extracted. It is estimated that only about one fifth of the oil in an oil sand is recoverable usually by the natural rock pressure. The flooding or Smith-Dunn process recovers a certain percentage more of this oil. My repeated experiment shows that my bubble method recovers ten or twenty per cent more than all the other methods combined.

In short, my bubble method enables me to overcome the limitation surrounding the usual flooding method. By combining gas and water I obtain by my bubble process more than the advantages of both the compressed air and the flooding methods, pushing ahead the residual oil in the same manner as is accomplished by these methods separately. But for the reasons already explained my methods can be used where these methods cannot. The bubbles suspended in the flood attract oil to the surfaces and thus cause the bubbles to act as carriers for residual oil that would not otherwise be recovered.

I claim:

1. A process of extracting oil from oil bearing strata by repeatedly and successively subjecting the exposed oil bearing strata in a well to water and gas under pressure, so as to alternately force water and gas into and through the oil bearing strata in predetermined quantities, finally collecting the water and oil at the point of discharge.

2. A process of extracting residual oil from oil bearing strata by means of sealing an intake well above the exposed oil bearing strata and alternately and repeatedly pumping water and air under pressure into the intake well below the seal, so as to repeatedly cover and uncover the exposed oil bearing strata and thus cause water and gas successively to enter the oil bearing strata and finally force the water, gas and recovered oil to the venting well.

3. A process of extracting residual oil from oil bearing strata by sealing a well above the exposed oil bearing strata, then forcing water into the bottom of the well below the seal under pressure, then forcing air into the bottom of the well and continuing to thus force water in and out of the bottom of the well alternately and repeatedly covering the exposed portion of the oil bearing strata with water and with air whereby water and air may be forced in predetermined amounts successively and repeatedly into the oil bearing strata continuing the pressure so as to force the water, air and recovered oil to the venting well.

4. The process of extracting oil from oil bearing strata consisting in supersaturating the flood with gas, by alternately forcing into the oil bearing strata a liquid and a gas under high pressure, thus forming bubbles artificially throughout the flood to pick up and carry the residual oil, and finally collecting the liquid and recovered oil at the point of least pressure.

5. The process of recovering residual oil from oil-bearing strata consisting in subjecting the oil-bearing strata to a flood of liquid and gas introduced alternately and repeatedly into the strata, whereby the strata is subjected to the searching action of both liquid and gas.

6. Apparatus for use in wells for forcing water and gas under pressure into strata consisting of a seal above the strata, a sump below the strata, a water feed pipe extending through the seal to below the strata, a gas feed pipe, extending through the seal to above the strata, a solid body, movably suspended in the well below the seal, having a cable attached thereto, extending through the seal to the top of the well.

7. An apparatus for recovering residual oil from oil bearing strata consisting of a seal above the strata, means of introducing through the seal water and gas under pressure into the well below the seal, a sump below the oil bearing strata, a movable solid body below the seal, and means of lowering and raising the solid body into and out of the sump, whereby the surface of the water in the sump may be raised and lowered to repeatedly cover and uncover the oil bearing strata, whereby water and gas may be successively and repeatedly forced into the oil bearing strata in predetermined quantities.

In testimony whereof I affix my signature.

WILLIAM L. RUSSELL.